(12) United States Patent
Meyer et al.

(10) Patent No.: US 7,380,698 B2
(45) Date of Patent: Jun. 3, 2008

(54) METHOD OF CONNECTING MODULE LAYERS SUITABLE FOR THE PRODUCTION OF MICROSTRUCTURE MODULES AND A MICROSTRUCTURE MODULE

(75) Inventors: Heinrich Meyer, Berlin (DE); Konrad Crämer, Berlin (DE); Olaf Kurtz, Berlin (DE); Ralph Herber, Berlin (DE); Wolfgang Friz, Berlin (DE); Carsten Schwiekendick, Berlin (DE); Oliver Ringtunatus, Berlin (DE); Christian Madry, Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 563 days.

(21) Appl. No.: 10/394,601

(22) Filed: Mar. 21, 2003

(65) Prior Publication Data

US 2004/0084509 A1    May 6, 2004

(30) Foreign Application Priority Data

Nov. 1, 2002   (DE) ................... 102 51 658

(51) Int. Cl.
*B23K 31/02* (2006.01)
(52) U.S. Cl. .................. 228/194; 228/206; 228/254
(58) Field of Classification Search .......... 228/190, 228/191, 193–195, 228, 254; 257/750, 751, 257/753, 757; 324/766; 136/203–205
See application file for complete search history.

(56) References Cited

U.S. PATENT DOCUMENTS

| | | | |
|---|---|---|---|
| 3,162,512 A | | 12/1964 | Robinson |
| 4,321,617 A | * | 3/1982 | Duda et al. ............. 257/751 |
| 4,613,069 A | | 9/1986 | Falke et al. |
| 4,737,228 A | | 4/1988 | Bridgland |
| 4,817,854 A | | 4/1989 | Tihanyi et al. |
| 4,917,642 A | * | 4/1990 | Nakahashi et al. ........... 445/44 |
| 5,023,147 A | * | 6/1991 | Nakata et al. ............... 428/627 |
| 5,144,412 A | * | 9/1992 | Chang et al. ................ 257/665 |
| 5,234,153 A | * | 8/1993 | Bacon et al. ............ 228/122.1 |
| 5,420,073 A | * | 5/1995 | DiGiacomo et al. .......... 216/14 |
| 5,440,239 A | * | 8/1995 | Zappella et al. ............. 324/757 |
| 5,449,955 A | * | 9/1995 | Debiec et al. .............. 257/751 |

(Continued)

FOREIGN PATENT DOCUMENTS

CH    690 029 A5    3/2000

(Continued)

OTHER PUBLICATIONS www.About.com Chemistry definitions:Diffusion.*

(Continued)

*Primary Examiner*—Kiley Stoner
(74) *Attorney, Agent, or Firm*—Paul & Paul

(57) ABSTRACT

A method for joining microstructured component layers and a method for manufacturing microstructure component layers and the microstructure component layer is provided. At least one multifunctional barrier coating is applied to the joining surfaces of a base material layer for the microstructured component layers. The layers are made of aluminum/aluminum alloys and/or copper/copper alloys, and/or noble steels. At least one solder/brazing coating is applied to each barrier coating. The coated base material layers comprising the component layers are stacked. The stacked component layers are joined by solder/brazing using heat. The melting temperature of the solder/brazing coating is higher after the heat joining than before same.

27 Claims, 9 Drawing Sheets

U.S. PATENT DOCUMENTS

| | | | |
|---|---|---|---|
| 5,641,990 A * | 6/1997 | Chiu | 257/737 |
| 5,712,448 A * | 1/1998 | Vandersande et al. | 136/203 |
| 5,937,320 A * | 8/1999 | Andricacos et al. | 438/614 |
| 5,990,560 A * | 11/1999 | Coult et al. | 257/772 |
| 6,204,089 B1 * | 3/2001 | Wang | 438/108 |
| 6,220,497 B1 * | 4/2001 | Benz et al. | 228/118 |
| 6,248,401 B1 * | 6/2001 | Chiang et al. | 427/96.8 |
| 6,250,541 B1 * | 6/2001 | Shangguan et al. | 228/208 |
| 6,303,405 B1 * | 10/2001 | Yoshida et al. | 438/46 |
| 6,388,185 B1 * | 5/2002 | Fleurial et al. | 136/205 |
| 6,409,072 B1 | 6/2002 | Breuer et al. | |
| 6,550,665 B1 * | 4/2003 | Parrish et al. | 228/180.22 |
| 6,753,253 B1 * | 6/2004 | Takahashi et al. | 438/676 |
| 6,768,207 B2 * | 7/2004 | Tao et al. | 257/777 |
| 6,774,659 B1 * | 8/2004 | Chiang | 324/765 |
| 6,778,406 B2 * | 8/2004 | Eldridge et al. | 361/776 |
| 6,829,824 B2 * | 12/2004 | Reschnar et al. | 29/890.041 |
| 6,919,137 B2 * | 7/2005 | Kawashima et al. | 428/617 |
| 7,033,930 B2 * | 4/2006 | Kozhukh et al. | 438/643 |
| 2002/0009869 A1 * | 1/2002 | Cotte et al. | 438/612 |
| 2002/0012811 A1 | 1/2002 | Wittebrood et al. | |
| 2002/0047217 A1 * | 4/2002 | Zakel et al. | 257/781 |
| 2003/0173720 A1 * | 9/2003 | Musso et al. | 264/635 |
| 2004/0035910 A1 * | 2/2004 | Dockus et al. | 228/56.3 |
| 2004/0262778 A1 * | 12/2004 | Hua | 257/778 |

FOREIGN PATENT DOCUMENTS

| | | |
|---|---|---|
| DE | 19528441 | 8/1995 |
| DE | 195 32 250 A1 * | 3/1997 |
| DE | 195 32 251 A1 | 3/1997 |
| DE | 197 08 472 A1 | 9/1998 |
| DE | 198 01 374 | 3/1999 |
| DE | 100 24 111 | 11/2001 |
| EP | 0 206 521 | 11/1986 |
| EP | 0206521 A2 * | 12/1986 |
| EP | 0 212 878 | 3/1987 |
| EP | 0206521 | 5/1988 |
| EP | 0 689 023 | 12/1995 |
| EP | 0 907 064 | 4/1999 |
| EP | 1 094 291 | 4/2001 |
| EP | 1094291 A2 * | 4/2001 |
| EP | 1 125 630 A2 | 8/2001 |
| JP | 63-132495 A * | 6/1988 |
| JP | 2003-10785 A * | 1/2003 |

OTHER PUBLICATIONS www.Dictionary.com definition:diffusion.*
The PAMIR study. A Market Survey, Mainz Institute of Microengineering GmbH and YOLE Development; 2002. (attached hereto).
Steffens, H.-D., Wilden, J., Mowald, K., "Use of ion-plated diffusion barriers and soldering/brazing systems when soldering/brazing steel/light metal compounds", (DVS, 166, 94-98, 1955). Relevance is as set forth on p. 6 of the specification.
Bocking, C., Jacobson, D. Bennet, G., "Layer Manufacturing of heat exchange elements using photochemical machining, electroplating, and diffusion brazing", Trans. IMP, 2000 78(6), 243-246. (attached hereto).
Bartels, F., Muschik, T., Gust, W., "Investigations into thermostable microbonds from intermetallic phases," DVS, (1991), 141, 22-24. Relevance is as set forth on pp. 7 and 8 of the specification.
Humpston, G.J., Jacobson, D.M., "Principals of Soldering and Brazing", 4 (2001), ASM International, The Materials Information Society, ISBN 0-87170-462-5. Relevance is as set forth on p. 4 of the specification.
Petrunin, I.E., "Contact Reaction Soldering/Brazing," Handbood of Soldering/Brazing Technology, Verlag Technik GmbH Berlin, 1990. Relevance is as set forth on p. 7 of the specification.
Ehrfeld, et al, "Microreactors," Wiley VCH, 2000. Relevance is as set forth on p. 1 of the specification.
Chemanager, Haben Ruhrkessel Ausgedient, May 2002.
International Search Report of International Application PCT/DE01/01570.

* cited by examiner

METHOD OF CONNECTING MODULE LAYERS SUITABLE FOR THE PRODUCTION OF MICROSTRUCTURE MODULES AND A MICROSTRUCTURE MODULE

BACKGROUND OF THE INVENTION

The invention relates to a method for joining microstructured component layers that are suitable for manufacturing microstructure components and that comprise metals, in particular aluminum and/or aluminum alloys, copper/copper alloys, and/or high-grade steels and furthermore relates to a microstructure component encompassing a stack of microstructured component layers that are joined to one another and that comprise metals and/or metal alloys, in particular aluminum and/or aluminum alloys, copper and/or copper alloys, and/or high-grade steels.

Microstructure components, that is, micro-(µ)-reactors, µ-mixers, and µ-heat exchangers are already employed in chemical process technology and in research and development projects. The first industrial processes have already been realized. For instance, the Clariant Company, Switzerland, jointly with the CPC Company, Germany, installed a pilot system for manufacturing two commercial azo pigments and tested the continuously-working method. The results of this method are that up to 149% greater color intensity, brighter and more transparent particles, etc. were attained (CHEmanager, May 2002). The PAMIR study (PAMIR: Potential and Applications of Microreaction Technology—A Market Survey, Mainz Institute of Microengineering, GmbH and YOLE Développement; 2002) provides a survey of the potential for microstructure technology and current industrial applications for microreaction technology. For further information on research and development projects, refer to Ehrfeld, et. al., "*Microreactors*," Wiley VCH, 2000 and to the proceedings of the "Microreaction Technology" conference, which has been held annually since 1997 (IMRET 1 through 6, 1997 to 2002).

Compared to conventional reactors and heat exchangers, microstructure components are characterized by excellent advantages:

1. Nearly isothermic method
2. High surface/volume ratio
3. Heat transfer improved by orders of magnitude, i.e., extremely compact high-performance heat exchangers for a wide variety of applications, e.g., for fuel cells, air conditioning in automobiles and airplanes, coolers for electronic components with high heat development
4. Extremely compact construction
5. Highest degree of system integration
6. Improved process controls
7. Very high safety standard, even during highly exothermic reactions.
8. Improved environmental protection Microstructure components in general comprise a stack of thin metal sheets that are characterized by fine structures. Joining the structured sheets results in components with very fine channels, whereby the cross-section is typically less than 1 mm². The sheets can be structured using dry etching methods, using wet chemical deep etching, or using mechanical microfinishing.

Normally the structured sheets are provided with a cover plate and a bottom plate and are joined into one compact component. When designed appropriately, the components attain maximum heat exchange or power exchange with minimum component volume, whereby the flow conditions in the component are adjustably defined and nearly isothermic conditions can be attained in the microchannels.

µ-Reactors, µ-heat exchangers, and µ-mixers on the market are generally made of high-grade steels because of the production engineering described in the following. In addition, the microstructure components with this production engineering cannot be employed in many fields of application, first because cost-efficient manufacture for large series and mass production is not possible and/or large numbers cannot be achieved at all or can only be achieved at great cost, and second the manufacturing method must lead to components that satisfy the following technical requirements:

1. Sealed, both between microflow channels and to the environment;
2. Pressure resistance/strength;
3. Corrosion resistance to media used;
4. Temperature resistance;
5. Free geometrically well defined fluid channels, that is, channels that are free of interfering residues from the manufacturing process.

In the prior art, thermodiffusion welding exclusively is used to join the stacked metal films for manufacturing metal µ-reactors, µ-mixers, and µ-heat exchangers. The stack of sheets to be joined, which is made of individual microstructured films, is welded to one another in a high vacuum under high pressure at high temperatures via interdiffusion. The advantage of this method is that monoliths, that is, component cores made of a uniform material, are produced. In order to provide sufficient interdiffusion, very high demands are placed on surface quality (roughness, purity, shape/planarity) during thermodiffusion welding to the components to be joined. This leads to restrictions in material selection and to expensive process conditions and material preparations. This is particularly dramatic in the case of aluminum and its alloys since the high oxygen affinity of the aluminum materials leads to the formation of oxide layers, even when work is performed under good vacuum conditions. In the past this problem has led to high reject rates during production so that this joining method is not economical for industrial applications. The subsequent housing process (forming a bond between the housing, including terminals, and the reactor body), typically by electron-beam welding, is subject to this restriction to an even greater extent since material combinations within a component are very difficult and very high local heat development can result in leaks in the diffusion-welding seams on the reactor body. Disadvantages of thermodiffusion welding are consequently the following listed complex manufacturing conditions: high vacuum, preferably very high joining temperatures (~1000° C.), long standing and processing times, and restrictions with respect to basic materials and material combinations. The resultant costs of such products drastically limit their use. The prices of such components are currently therefore between a few hundred and a few thousand Euros (e.g., in accordance with price lists from the Mainz Institute of Microengineering).

Soldering/brazing processes have the disadvantage that the joining coating comprises other metals than the stacked films. However, these methods offer fundamental advantages in terms of costs. Although soldering/brazing methods have been suggested repeatedly as a joining technique for microstructure components, in the past it has not been possible to use soldering/brazing methods for industrial manufacture of µ-components since the requirements during the manufacture µ-components are very stringent:

1. No solder/brazing material may run into the channels during the melting process so that the channels become stopped up.
2. Work must be performed without any flux at all since flux residue cannot be removed from the finished component, or is extremely difficult to remove;
3. The solder/brazing coating must be very thin, homogeneous, uniformly distributed, and still error-free due to the small dimensions and complexity of the structure.

Humptson (Humptson, G. J., Jacobson, D. M., "*Principles of Soldering and Brazing,*", 4 (2001), ASM International, The Materials Information Society, ISBN 0-87170-462-5) describes Transient Liquid Phase Bonding in greater detail. This is a diffusion soldering/brazing method in which one or two solder/brazing coatings are produced between the parts to be bonded and the bond is heated to a temperature above the melting point of the solder/brazing material. The bond is heated over a lengthy period in order to make possible interdiffusion of the solder/brazing metals and the metals of the base materials. A eutectic melt of the two metals or alloys can also be formed if two different solder/brazing metals or alloys are used. It is assumed that copper, silver, or gold is used as solder/brazing material for most of the solder/brazing processes. A typical example of a solder/brazing material for use in a diffusion method is the copper/tin alloy system.

CH 690 029 A5 describes a fusible coating made of at least two layers on a substrate, in particular that can be used for solder/brazing. The manufactured substrates can be used advantageously for gas- and liquid-tight joints in watch housing parts using brazing. For manufacturing the soldering/brazing coating, two partial coatings are deposited electrolytically. During the brazing process the coatings form a eutectic melt that has a melting point at the temperature that is usual for brazing, that is, in general a melting point above 450° C. and below approx. 1000° C. For the solder/brazing coating, gold and nickel are indicated as components in a ratio of approximately 7:3 for brazing white gold, stainless steel, and titanium and titanium alloys with high portions of titanium. Other metal combinations that can be used for brazing are for instance manganese and copper as well as copper and silver. If a gold/nickel coating is applied to stainless steel, preferably a coating of gold is first deposited on the substrate.

Furthermore, EP 0 212 878 A1 describes a method for manufacturing a heat exchanger in which the flow channels for the heat medium are formed in steel plates. The steel plates are bonded to one another using diffusion bonding.

As discussed in the foregoing, microstructures currently on the market are overwhelmingly made of high-grade steel due to production constraints. But a particular challenge with respect to producing microstructure components is the use of aluminum/aluminum alloys, especially in terms of joining. In the past no microstructured components that satisfied the aforesaid technical requirements could be made from aluminum materials. For this reason this problem should be discussed in greater detail at this point:

The low density (2.7 g/cm$^3$) of aluminum and its favorable strength properties make possible optimum shape and light weight construction and thus substantial savings in weight. This reduction in the mass of the component is extremely important for applications in vehicle design and aerospace engineering. In addition to combining light weight with great strength, aluminum has a highly electropositive character and correspondingly has a high affinity to atmospheric oxygen. In contrast to easily corrosive steel, aluminum is resistant to air due to the formation of a coherent thin oxide coating, since this prevents further attack, and thus corrosion, by oxygen.

It is precisely this protective coating responsible for aluminum's high corrosion resistance that prevents successful bonding of aluminum layers or parts during the manufacture of microstructure components or that leads to high reject rates and must therefore absolutely be removed prior to the joining process. Used for this for instance during brazing are fluxes that normally melt at temperatures of approx. 570° C. and dissolve the Al oxide coating. Use of flux should be avoided when possible since there are substantial disadvantages associated with its use, such as for instance environmental pollution, corrosion, undesired reactions between flux and for instance alloy constituents of the base material, and additional costs associated therewith. In addition, large surface areas can often be bonded together only inadequately when flux is added since build-ups can occur due to incomplete run-off of the flux during the joining process and this can cause the probability of corrosion to rise sharply. For these reasons other methods have been developed in which joining can be performed without using flux. None of these methods in the past has been able to be employed to successfully manufacture microstructured components, however.

Currently intensive research is being devoted to resolving the problems associated with joining microstructured components made of aluminum/aluminum alloys because of the great importance of aluminum materials.

In general soldering/brazing is already employed commercially as a thermal joining method in a vacuum or in an inert gas atmosphere. However, the films or pastes used when soldering/brazing the microstructure easily lead to the microchannels becoming stopped up, so that this method is not suitable for use as a joining method for microstructure components. Furthermore, the addition of flux normally used during soldering/brazing can lead to corrosion of the joints since the flux accumulates in the solder/brazing gap of the microchannels. In addition, flux is very unfriendly to the environment and its effects cannot be minimized without taking complex and expensive steps to purify waste water and exhaust air. Also, there can be undesired reactions between the flux and the alloy additives so that the bond desired between the joining partners does not have the desired properties in addition, when manufacturing catalyst-coated microreactors the use of flux can lead to deactivation of the catalyst used.

For joining aluminum and/or aluminum alloys, US 2002/0012811 A1 for instance provides that the material on the surfaces to be joined are first pretreated and then a metal coating containing nickel that also contains bismuth is electrolytically applied to the pre-treated surfaces. The joining process can be performed without flux. The nickel/bismuth-coated aluminum materials can be used for manufacturing heat exchangers.

Steffens, H.-D., Wilden, J., Möwald, K., "Use of ion-plated diffusion barriers and soldering/brazing systems when soldering/brazing steel/light metal compounds," (DVS, 166, 94-98 (1955)) provides that eutectic aluminum base solder/brazing can be used for flux-free soldering/brazing. Prior to applying the aluminum base solder/brazing, a coating of titanium as an adhesive agent and a nickel coating as a wettable surface, which also acts as a diffusion barrier, is applied by means of TiNi ion plating.

Petrunin, I. E., "Contact Reaction Soldering/Brazing," Handbook of Soldering/Brazing Technology, Verlag Technik GmbH Berlin, 1990, provides techniques for soldering/ brazing aluminum and its alloys. According to it, aluminum can be soldered/brazed without flux in a gas atmosphere using the contact reaction method without using surface protective coatings. Silicon, copper, or silver can be used for solder/brazing material; they are applied to the aluminum surface electrolytically, by vapor-deposition, or by screen printing. Surface protective coatings, for instance coatings made of aluminum, copper, nickel, silver, zinc, etc., can also be used if no flux is to be used. The coatings can also be formed electrolytically or chemically.

DE 197 08 472 A1 describes a manufacturing method for chemical microreactors in which the fluid channels are formed in individual planes. The individually manufactured planes are then collected into a stack and joined securely to one another, for instance by soldering/brazing. The individual substrates can comprise metals/metal alloys. For joining the individual layers, one method cited is a brazing method using solder/brazing containing silver, and another method is cited in which first tin coating is deposited and then a bismuth coating is deposited thereupon. In this case a low fusing eutectic mixture forms at the interphase when the coatings are heated and further tempering forms a bond that has an elevated melting point.

For manufacturing a heat exchanger for a Stirling motor, in accordance with Bocking, C., Jacobson, D., Bennet, G., "*Layer manufacturing of heat exchange elements using photochemical machining, electroplating, and diffusion brazing*", Trans. IMP, 2000 78(6), 243-246, copper sheets are used in which fluid flow channels are formed using chemical etching. The sheets are joined to one another using a diffusion brazing method. Tin is electrolytically deposited on the copper sheets, and the sheets are brazed to one another with heat.

Bartels, F., Muschik, T., Gust, W., "*Investigations into thermostable microbonds from intermetallic phases,*" DVS, (1991), 141, 22-24, reports on a brazing method in which intermetallic phases of binary systems are formed whose components have very different melting points. Examples listed are the binary systems Cu(Sn), Pt(Sn), Ni(Sn), and Ni(In). The report describes the Cu(Sn) system in greater detail.

It is therefore particularly remarkable that despite a great deal of work that has been performed in the field of joining methods to date there has not been any success in satisfying the requirements that were enumerated in the foregoing for manufacturing microstructure components, and that this is so even though microstructure components have already been discussed and produced as promising elements for a number of applications for some time.

Despite the substantial need to employ such components for individual applications, to date it has not been possible to manufacture microstructure components economically in large numbers. One reason for this is that in the past the available joining techniques for bonding the individual component layers were not suitable for manufacturing the microstructure components with sufficient yield. The problem is that the aforesaid requirements cannot be fulfilled satisfactorily. For instance, it is not possible without additional measures to obtain sufficient pressure resistance with sufficient gas- and liquid-tightness both between the microflow channels and to the environment (for instance, He leakage test: $1 \cdot 10^{-8}$ mbar·L/s) and at the same time to ensure that the microchannels remain completely free of the joining agent, for instance a solder/brazing material, and do not become stopped up.

SUMMARY OF THE INVENTION

Thus, the problem upon which the present invention is based is that known manufacturing methods for microstructure components are not sufficiently reliable to ensure that the pressure resistance and corrosion resistance of the component is high enough that the component's tightness against fluid exiting from the component or fluid spilling over into adjacent microchannels is high enough and that the microchannels have a sufficiently low flow resistance. In addition, known manufacturing methods are not cost-effective enough that the microstructured components can be employed in a wide variety of applications.

The described problems are solved by the method in accordance with claim 1 and by the microstructure component in accordance with claim 26. Preferred embodiments of the invention are provided in the subordinate claims.

For the purposes of the present invention, microstructure components include all components that comprise microstructured individual layers and that are suitable for performing chemical reactions, exclusively for heat exchange, for cooling or heating articles, for mixing fluids, or for a combined application. The microstructure components generally comprise a plurality of component layers that are joined to one another gas- and liquid-tight, whereby there are microchannels for fluids in the component, in particular flow channels for fluids and other hollow spaces, that are responsible for the functionality of the components.

When reference is made to a soldering/brazing method in the specification and in the claims, this shall be understood to be a method in which the joining partners are bonded using the addition of another material, whereby the material is present in the joint seam at least initially in a fusible form. Brazing and soldering methods are differentiated: During the brazing method a material is used that has a melting point that is at least initially greater than 450° C. In soldering, this melting point is at least initially no greater than 450° C.

When reference is made in the specification and in the claims to a high melting point material coating, this shall be understood to be a material that has a melting point that is greater than 450° C. When reference is made in the following to a low melting point material coating, this shall be understood to be a material whose melting point is no greater than 450° C.

The claimed method joins the microstructured component layers for a microstructure component to one another using soldering/brazing. For manufacturing the inventive microstructure components, the microstructured component layers on joining surfaces are first provided with at least one multifunctional barrier coating and then are provided with a solder/brazing coating on the at least one barrier coating, then the component layers prepared in this manner are stacked and soldered/brazed to one another using heat.

This results in a microstructure component that comprises a stack of microstructured component layers that have been joined to one another and that comprise materials selected from the group including metals and metal alloys and that has at least one multifunctional barrier coating and one solder/brazing coating between the individual component layers. The present invention is thus based on a joining method for microstructure components made of component layers that have at least one multifunctional barrier coating, especially on the joining surfaces of the individual component layers, and a solder/brazing coating applied thereto.

When using known joining techniques it has been determined that the joining bonds are not strong enough in particular when the microstructure component is under high operating pressure. In particular it has been observed that the fluid processed in the component frequently exits the component when the operating pressure in the component is relatively high. In many cases it has also been determined that fluid spills over from one flow circuit in the component into another flow circuit because it is not possible to attain an adequate seal between the different flow circuits. It has not always been possible to determine the causes of this. One possible cause may be that the joining surfaces in the microstructure components are extremely small because the microchannels have to be housed in a very small space due to the high integration density of the microstructure component. Thus it seemed an obvious measure for eliminating this deficiency to change the flow channel design such that a joining surface that is adequate in size is available between the individual microchannels. However, this optimizing measure rapidly ran into trouble since the freedom for changing the design in the desired manner is highly limited by the integration density requirements for the microstructure components.

Very careful diffusion bonding of microstructure components comprising steel or copper sheets resolved the problem with the limitations described in the foregoing. However, another problem arose in that only extremely flat steel or copper sheets with high surface quality are suitable for gas- and liquid-tight bonding of the sheets, while the joining method when using sheets with different and in particular lower surface quality does not lead to the desired gas- and liquid tight bonding of the sheets. In addition, in particular aluminum sheets and sheets made of aluminum alloys are not at all suitable when it comes to the microstructure component being gas- and liquid-tight when high internal pressure is applied.

The problems described are resolved for the first time by producing the described coating structure from a multifunctional barrier coating and solder/brazing coating.

It has been determined that the multifunctional barrier coating prevents the elements in the solder/brazing coating from diffusing into the metal base material just as it prevents the elements of the metal base material from diffusing into the solder/brazing coating. In particular this prevents depletion of the fusible phase of certain metal species during soldering/brazing and thus prevents undesired reciprocal effects between the solder/brazing coating and the base material. In addition, brittle phases are prevented from forming in the base material and/or in the solder/brazing coating due to interdiffusion. In addition, the fusible solder/brazing coating is prevented from depletion by solder/brazing constituents diffusing into the base material, thus preventing a secure bond between the solder/brazing material and the base material. Furthermore what this achieves is that the joining partners can be soldered/brazed without the use of a flux. That is, the barrier coating also prevents oxidation of the base material.

The inventive joining method is for manufacturing microstructured component layers and microstructure components under conditions that protect the material. In addition to copper and/or copper alloys and high-grade steels, it also makes it possible for the first time to economically use aluminum and aluminum alloys as cost-effective materials for microstructure components. While the inventive joining method makes it possible for the first time ever to manufacture microstructure components in the case of aluminum and aluminum alloys, it also offers all of the advantages of a low temperature process when using other metals and metal alloys. This can lower processing costs through savings in energy costs and protects the environment. Furthermore it is not necessary to use expensive high-temperature materials for building a high-temperature oven and thus the initial capital outlays for equipment for the manufacturing process are lowered. In addition, the protective process at low joining temperatures increases the form stability of the components while satisfying stringent technological quality requirements in terms of seal, strength, and especially corrosion stability.

The inventive joining method resolves the problems described in the foregoing that result from the formation of an oxide coating on aluminum materials, especially for joining these materials, and thus satisfies not only the technical requirements for the product and the manufacturing method and in particular the joining method, but also the need to provide an option for industrial and cost-effective production. This is the only way the microstructure components can find broad areas of application in the future.

The multifunctional barrier coating embodies in particular at least one metal selected from the group that includes molybdenum, manganese, chromium, palladium, iron, nickel, and alloys of iron and/or nickel, with phosphorous. If the soldering temperature is not selected too high, practically no interdiffusion of the elements of the barrier coating into the base material or out of the base material takes place.

The multifunctional barrier coating has in particular a thickness of approximately 1-10 μm. Through the multifunctional barrier coating, irregularities on the base material can be compensated if the material is deposited in a sufficient thickness. Thus the barrier coating in this case also forms a homogenous base for the solder/brazing coating to be deposited upon. Furthermore the barrier coating also provides the adhesiveness between the base material and the solder/brazing coating. The barrier coating forms a secure bond to the base material when heat is added. This lays the foundation for sufficient pressure stability and strength in the microstructure component.

The multifunctional barrier coating can in particular be produced by means of electroplating methods. Applied as an electroplating method for instance for depositing the barrier coating is preferably an electrolytic, external electroless or cementative metal deposit method. External electroless metal deposition shall be understood to be a method in which metal is deposited without the external effect of electrical current. A cementative method shall be understood to be a method, for instance, in which the metal is deposited from a deposit bath that contains a reducing agent for metal deposition. A cementative method shall be understood to be a method, for instance, in which the metal is deposited from a deposit bath that does not contain a reducing agent for the metal, whereby the metal however is deposited by charge exchange with the surface of the base material. In this case, therefore, the metal is deposited while the base material dissolves. Since the coating thickness of deposited metal and thus the quantity of the deposited material is relatively simple to maintain in narrow limits when using electroplating methods, it can be assured that the microchannels of the microstructure component are not stopped up by the material in the barrier coating.

The soldering/brazing method is preferably a diffusion soldering/brazing method (SDL). This shall be understood to be a soldering/brazing method in which a plurality of elements of the solder/brazing material interdiffuse and thereby form intermetallic phases. If only one pure metal is used for the solder/brazing material, this metal can diffuse into one of the two joining partners. Intermetallic phases can also result.

For instance, the composition and thickness of the partial solder/brazing coatings during the diffusion soldering/brazing method can be coordinated with one another such that an initial eutectic melt forms during the joining process. Thus at first a very low melting temperature is attained. Through interdiffusion of the elements of the solder/brazing material between the various solder/brazing coatings, the melting point gradually shifts to a higher temperature during the soldering/brazing process. That is, by tempering the joining bond, during the diffusion soldering/brazing a secure soldering/brazing bond is gradually attained with a melting point that is substantially higher than the melting point when the solder/brazing coating first began to melt. It has proved particularly advantageous that a solder/brazing coating is produced that comprises at least one partial solder/brazing coating and in particular two partial solder/brazing coatings. In this case the multifunctional barrier coating can be applied to each of the surfaces to be joined in order to prevent diffusion of elements from the base material into the joint seam and from there into the base material. A high-melting solder/brazing material is attained by diffusion of the elements of the various partial solder/brazing coatings into one another. Alternatively the solder/brazing coating can also be formed by joint deposition of a plurality of metals.

In another preferred embodiment of the invention, provided for one of the partial solder/brazing coatings are high-melting partial solder/brazing coatings and provided for the other of the two partial solder/brazing coatings are low-melting partial solder/brazing coatings, whereby the high-melting partial solder/brazing coating is in particular deposited first and the low-melting partial solder/brazing coating is deposited thereafter. This embodiment achieves particularly high strength in the soldered/brazed bond. The re-melting temperature of the soldered/brazed bond can be intentionally influenced by the selection of the composition of the partial solder/brazing coatings. Thus, for instance, by using an excess of the high-melting solder/brazing components, the re-melting temperature can be intentionally raised by forming mixed crystals and/or intermetallic phases with a great excess of higher-melting solder/brazing components. Pressure stability (bursting pressure), which is very important for microstructure components, is also particularly high when the solder/brazing coating comprises the cited partial solder/brazing coatings. The elements of the two partial solder/brazing coatings are preferably, but not necessarily, combined with one another in the stoichiometry of desired intermetallic phases. In the case of forming desired mixed crystals, the quantity of the low-melting components is minimized correspondingly. If the elements of the two partial solder/brazing coatings are selected such that the two elements can form a eutectic melt, then the soldering/brazing temperature can be set below the melting temperature of each individual solder/brazing element if the soldering/brazing temperature is above the melting temperature of the eutectic intermetallic phase. If the composition of the partial solder/brazing coatings does not correspond to their eutectic melt, the temperature is preferably selected just above the melting temperature of the low-melting partial solder/brazing coating. If component requirements in terms of pressure stability and strength are not very stringent, the processing time in both of the cases described in the foregoing can be shortened in that a tempering step (subsequent temperature treatment) follows the shortened soldering/brazing process. This leads without additional pressure to improved pressure stabilities and strengths in the components, which can be sufficient for certain applications. If the available temperature range of the pressure tool is limited, a pressure process can also be performed at lower temperatures. Subsequent tempering at a higher temperature without a pressure tool also leads to higher component strengths (see examples 2c and e). The tempering step continues the interdiffusion and/or phase formation and/or formation of the mixed crystal as a function of tempering time and temperature after the shortened soldering/brazing process. Cooling can be passive or active, e.g., by using a cooling press.

Therefore overall work can be done at a very low soldering/brazing temperature. In particular what this achieves is a very mild treatment of the individual component layers so that a distortion of the individual layers, including base plate and cover plate, by thermal load is practically impossible. The tempering process (soldering/brazing process) is preferably performed at a constant temperature (isothermally). In addition, uniform pressure can be exerted on the joining partners during the tempering process in order to attain a homogeneous intimate bond of the joining partners to one another. The components to be soldered/brazed are preferably soldered/brazed in a vacuum or in an inert gas atmosphere (for instance argon, nitrogen) in order to assure that no oxide coatings form on the base material or on the solder/brazing coating again during soldering/brazing.

The component layers are in particular bonded to one another by the simultaneous application of heat and pressure. Forming fusible phases when the solder/brazing material is melted and using isothermal tempering can produce a very homogeneous joint seam that is extremely corrosion-resistant and that is very strong.

The high-melting and low-melting partial solder/brazing coatings can be applied on one side or on both sides in different sequences to each and/or, for instance, to only every second component layer locally or across the entire surface. Preferably the high-melting partial solder/brazing coating is applied first and then the low-melting partial solder/brazing coating is applied. If a solder/brazing coating embodies at least one high-melting and one low-melting partial solder/brazing coating, the high-melting partial solder/brazing coating can embody at least one metal selected from the group preferably including nickel, silver, gold, and copper. In this case the low-melting partial solder/brazing coating can embody at least one metal selected from the group preferably including tin, indium, and bismuth.

Thus, by melting the solder/brazing coating comprising the two partial solder/brazing coatings, an intermetallic phase forms, e.g., comprising gold, silver, nickel, and/or copper on the one hand and tin and/or indium and/or bismuth on the other hand. Once the metals of the high-melting and low-melting partial solder/brazing coating have interdiffused for long enough during tempering, a soldered/brazed bond results that is very strong and that in particular has a high melting temperature that is clearly above the soldering/brazing temperature.

The thickness of the solder/brazing coatings is preferably approximately 1-20 μm. The solder/brazing coatings are also preferably produced using electroplating methods. Carefully controlling the coating thickness of the deposited solder/brazing material and thus the quantity of the deposited material ensures that the solder/brazing does not penetrate into the very fine microchannels of the individual component layers and stop them up. Therefore assured production of the microstructure components with low flow resistance is attainable with the inventive method. In the case of a charge exchange method for electroplating formation of the solder/brazing coatings or of the partial solder/brazing coatings, a charge exchange preferably occurs with the barrier coating upon which the solder/brazing coating in particular is deposited. If the barrier coating is relatively thin, however, it can also have pores, so that the charge exchange occurs at least in part with the base material surface, as well.

The solder/brazing coatings and/or the multifunctional barrier layer can either be deposited exclusively on the joining surfaces of the component layers or can also be deposited on the walls of the microchannels in the component layers. In the latter case, the composition of the intermetallic phases that form when the solder/brazing material melts can be selected such that these phases also act as corrosion protection in the microchannels.

The microstructured sheets can first be coated with the multifunctional barrier coating and then with the solder/brazing coating. The coated sheets can be stored for long periods of time without worrying that the base material surfaces will corrode and that then they cannot be brazed without using flux. Thus no flux is needed during soldering/brazing. The solder/brazing coating and in particular the multifunctional barrier coating prevent tarnishing of the base metal surfaces so that solderability/brazability is maintained over lengthy periods of time. The solder/brazing coating is preferably formed from a plurality of layers of different composition by local and/or full-surface, electrolytic or electroless metal deposition. Finally, the microstructured and solder/brazing-coated component sheets are place one upon the other such that a stack results. Situated between the component sheets is the solder/brazing material without direct contact to the base material and therefore physically restricted ("blocked") by the barrier coating. By exerting uniform pressure on the stack while heating, the solder/brazing material melts so that the desired solid-, gas- , and liquid-tight soldered/brazed bond forms.

Prior to forming the multifunctional barrier coating and the solder/brazing coating, the base material is first chemically pre-treated in a suitable manner. For instance, the base material is degreased and cleaned of surface oxides. For instance, a zinc mordant can also be used that largely comprises a highly alkaline zinc hydroxide solution. Then the barrier coating is applied in the manner described in the foregoing. If a noble metal is to be deposited on the multifunctional barrier coating as the higher-melting component of the solder/brazing coating, a thin coating of a noble metal must first be deposited from a solution containing complexing agent, particularly preferred a thin coating of the noble metal that will later be deposited as solder/brazing component, in order to improve its adhesion and to avoid mordant deposits (a cementative deposit). Then the solder/brazing coating is deposited as described in the foregoing. Preferably the high-melting solder/brazing components are used first, for instance copper, gold, nickel, and/or silver, and then the low-melting components are used, for instance tin and/or indium and/or bismuth.

In one preferred embodiment of the inventive method, after the photolithographic process step, the chemical etching for producing the microstructure, and the galvanic deposition of functional coatings as described in the foregoing for joining the sheet stack and/or the sheets and if necessary non-structured closure sheets that also have feed and return connectors for the fluid, vacuum laminating systems (laminating presses, e.g., RMV 125, RMV 125 from Maschinenfabrik Lauffer GmbH & co. KG), non-structured closure sheets individual or in multiple panels, can be used that are already employed in the manufacture of multilayer PC boards, for instance. The manufacture of µ-coolers, µ-heat exchangers, and µ-reactors with a design that can be mass-produced can thus be accomplished using a cost-effective and mass-producible and tested method.

The pressure tools for a typical laminating system typically comprise two plates, layers, or films made of one material selected from the group including metals, ceramics, graphite, and composites. Metal plates and/or ceramic plates and/or graphite plates are used in particular, whereby one forms the bottom plate and the other the top closure for the pressure apparatus. Both pressure plates absolutely must satisfy the requirement of negligible yoke formation in order to ensure planar pressing surfaces for applying pressure.

Placed on the bottom plate and used as pressure cushions are preferably high temperature-proof ceramic fiber papers as ceramic fleece in a thickness of approximately 1-10 mm, preferably 2-4 mm. This compensates a potential difference in height between the components and provides uniform pressure distribution. Then an intermediate plate, preferably made of graphite, ceramic, steel, or composite, that has sufficient flectional strength, pressure stability, and heat conductivity, in a thickness of 1-30 mm, preferably 10-20 mm, is placed on the ceramic fiber paper in order to prevent it from bonding to the metal components. The components layers are stacked on the intermediate plate, either individually or preferably in multiple panels. If films of multiple components are to be joined at the same time stacked individually or in multiple panels, the films are separated from one another for instance by graphite intermediate layers.

In the case of joining individual stacks, the offset of the individual films is minimized by the use of special registration apparatus, registration pins, or templates. The registration apparatus, registration pins, or templates preferably comprise a material selected from the group including graphite, ceramic, and metal, the surface of which is coated with an appropriate protective coating, preferably a protective ceramic coating. The height of the registration apparatus, registration pins, or templates should be lower than the stack of films. However, it is also possible to provide corresponding depressions in the base plate and cover plate, which can then offer the advantage of registration on both sides (from above and below). When using multiple panels, preferably metal or non-metal registration pins can be used. For this purpose, provided in the structuring process in the edge area of the panel are corresponding recesses into which registration pins can be inserted so that a low offset in the components can be assured with minimum tolerance. Also, the registration pins preferably are lower in height than the entire component. However, the panels can also have structural features, preferably in the edge area of the component layers, that facilitate auto-registration, e.g., stamped, etched, or punched depressions that prevent the individual layers from being offset when stacked. After the soldering/brazing process, the component layers are detached from the multiple panels, e.g., by cutting, milling, punching, lasering. Placed on the panels or on the films stacked in the registration apparatus is a graphite platter and ceramic fiber paper that form the closure to the upper pressure plate.

The stack of solder/brazing-coated and/or microstructured component layers (sheets or multiple panels) is then joined using heat and pressure in the vacuum or in an inert gas atmosphere. Preferred conditions for the soldering/brazing process are soldering/brazing temperatures from 100-600° C. and a pressure under which the stack is pressed of at least 0.1 MPa, especially at least 0.5 MPa. Additional important parameters for the soldering/brazing process are the pressure in the joining apparatus, heating rate, temperature hold duration (tempering time) and cooling time. The three latter parameters and the thickness of the individual partial solder/brazing coatings and the pressure can in particular be adjusted to control the intermetallic phase formation in the solder/brazing seam. Longer heating and cooling phases and longer tempering times can cause the elements in the partial solder/brazing coatings to diffuse more into one another. On the other hand, the tempering time selected can be used to control the type and quantity of the intermetallic phases that form in the solder/brazing seam. The types of intermetallic phases naturally depend in particular on the types of metals in the solder/brazing coating. In one preferred embodiment of the invention, the component layers are joined to one another using at least one rapid method selected from the group including heating and cooling. Rapid heating and cooling methods shall be understood to be methods in which the speed is in the neighborhood of more than 5 degrees/min.

In order to achieve a uniform, full-surface bond of the individual sheets to one another, a minimum pressure must be exerted as a function of temperature and the coating thickness of the solder/brazing coating or partial solder/brazing coatings must be uniformly distributed on the stacks to be joined. In addition to improving the contact of the surfaces to be joined and therefore accelerating the interdiffusion and formation of the intermetallic phases, the brittle phase formation and distribution can be favorably influenced by the pressure or avoided altogether. Avoiding or distributing the brittle phases is crucial for later strength and corrosion-resistance. Pressures of less than 0.1 MPa during the soldering/brazing process yield only inadequate strengths and pressure stabilities.

Depending on the composition of the solder/brazing coating, the soldering/brazing temperature is in the range of 100-600° C. The heating rate must be selected such that the barrier coating can react for sufficient adhesion with the base material. On the other hand, the interdiffusion of the solder/brazing components into the other coatings during heating must not lead to depletion of the fusible phase, with the consequence that the bond does not achieve sufficient strength.

BRIEF DESCRIPTION OF THE DRAWINGS

The following figures and examples are used to explain the invention:

FIG. 6a: is a top view of a template in a second embodiment;

FIG. 6b: is an illustration of a detail from FIG. 6a;

FIG. 8a: is a cross-sectional illustration of a soldering/brazing structure for soldering/brazing multiple panels;

FIG. 8b: is an illustration corresponding to FIG. 7a.

EXAMPLE 1

Figure 1:
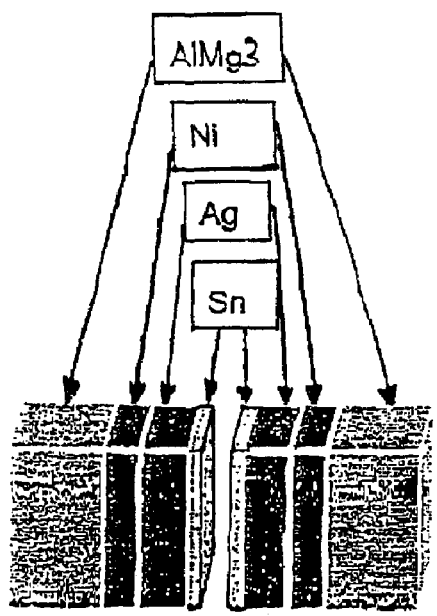
FIG. 1: is a schematic illustration of the formation of a multifunctional barrier coating and intermetallic phases of the partial solder/brazing coatings on a base material in four steps (FIGS. 1a to 1d).
Figure 1:
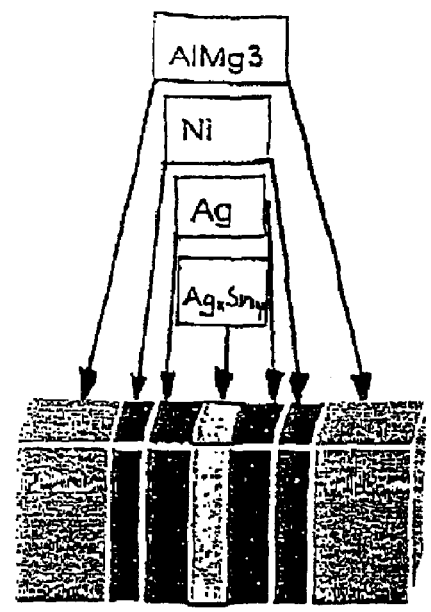
Figure 1:
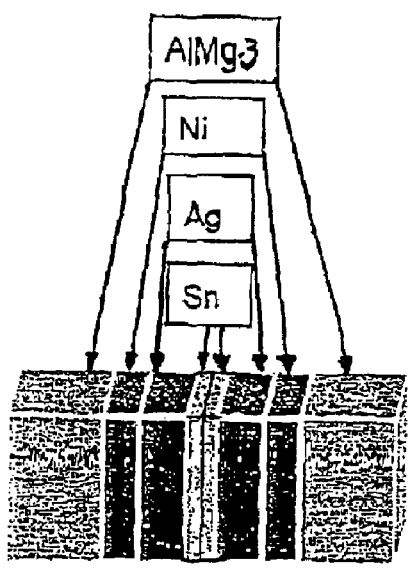
Figure 1:
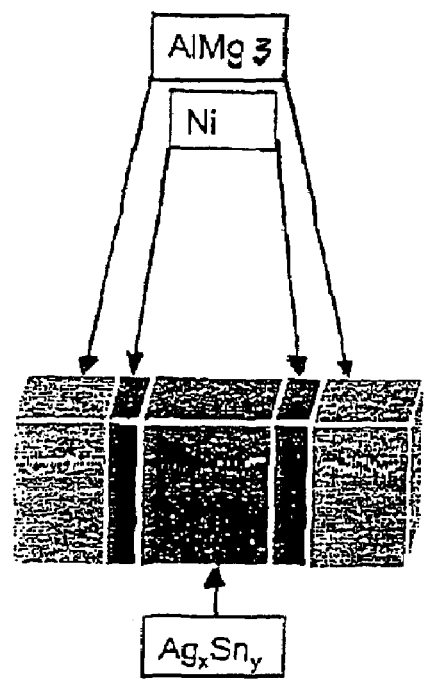

0.3-mm thick AlMg3 sheets were provided with flow channels in that a flow channel pattern was imaged on the sheets by means of photolithography and the channels were then formed using deep etching.

Before functional coatings were applied to the walls of the flow channels, the sheets were cleaned and pretreated. For this, the sheets, including cover sheet and bottom sheet, were:

1. degreased (wetting agent containing alkaline solution; Uniclean® 155, 3 wt. %, Atotech Deutschland GmbH)
1a. Rinsed
2. Pickled (acid pickle: alumEtchS®, Atotech Deutschland GmbH)
2a. Rinsed
3. Treated with a zinc mordant (highly alkaline solution of zinc hydroxide; AlumSeal 650®, Atotech Deutschland GmbH)
3a. Rinsed Pretreatment steps 2, 2a, 3, and 3a were performed twice successively.

After the zincate coating was formed uniformly, the barrier coating and the solder/brazing coating were deposited. For this, first was:

4. Nickel deposition (electroless or electrolytically), thickness 5 μm (nickel sulfamate bath from Atotech Deutschland GmbH)
4a. Rinsing The nickel coating acts a multifunctional barrier coating. Then a thin coating of silver was deposited on the barrier coating from electrolytes containing a silver complex. For this:

5. Pre-silver was deposited (electrolytically), thickness <1 μm (silver Trisalyt®, Atotech Deustchland GmbH)
5a. Rinsing Then the solder/brazing coating was formed. For this, first was 6. Silver deposition (electrolytically), thickness 7 μm (AgO-56®, Atotech Deutschland GmbH)
6a. Rinsing Silver acted as a high-melting partial solder/brazing coating. Then the low-melting partial solder/brazing coating was deposited. For this:

7. Tin was deposited (electrolytically), thickness 2.5 μm (Sulfotech™, Atotech Deutschland GmbH)
7a. Rinsing
7b. Drying The sheets were each rinsed with deionized water. The coated sheets were stacked in a laminar press either individually or preferably in the multiple panels. A soldering temperature of 330° C. was set at a heating rate of 7 K/min. Once achieved, the soldering temperature was maintained for 30 minutes. After 30 minutes, the stack was cooled inactively. The cooling phase was 90 minutes long. A pressure of 4.5 MPa was exerted on the stack during the entire soldering process.

FIG. 1 illustrates the coating sequences on the base material in the individual phases of the manufacturing process:

As can be seen in FIG. 1a, a barrier coating made of Ni has been formed on the aluminum base material, a high-melting partial solder/brazing coating made of silver has been formed upon each of these, and finally a low-melting partial solder/brazing coating made of tin has been formed upon each of these. FIG. 1b illustrates the form of the stack prior to the beginning of the soldering/brazing process. The individual coatings are still present. In the progress of the interdiffusion of the partial solder/brazing coatings into one another can be seen in FIG. 1c: While the barrier coatings are completely present on the aluminum base materials, partial interdiffusion of the partial solder/brazing coatings has already begun, with a central intermetallic $Ag_xSn_y$ phase forming. A portion of the high-melting partial solder/brazing coating and a portion of the low-melting partial solder/brazing coating are still present. FIG. 1d illustrates the conclusion of the interdiffusion after the soldering process has been performed: Both partial solder/brazing coatings have completely disappeared in the diffusion. As shown in FIGS. 1a through 1d, the various solder/braze coatings between two substrates to be joined form a symmetrically oriented "sandwich" of the different metallurgical solder/brazing phases (coatings), wherein these coatings are sandwiched, symmetrically to coating orientation, between the joining surfaces of two base material substrates which are juxtaposed when they are joined by applying heat and pressure. The respective low-melting partial solder/brazing coatings are in the middle of the sandwiched phases and the respective high-melting partial solder/brazing coatings on the outside of each respective low-melting coating. The respective multifunction barriers are each on the outside of the respective high-melting partial solder/brazing coatings, with the respective base material substrates on the far outside.

The stoichiometric composition of the individual coatings was determined with SEM/EDX (scanning electron microscope/energy-dispersive Xray) and corresponded primarily to the intermetallic phase $Ag_5Sn$ (ζ phase).

EXAMPLE 2

0.3 mm-thick Cu sheets were provided with flow channels in that a flow channel pattern was imaged on the sheets by means of photolithography and the channels were then formed using deep etching. Before functional coatings were applied to the walls of the flow channels, the sheets were cleaned and pretreated. For this, the sheets, including cover sheet and bottom sheet, were:
1. degreased (wetting agent containing alkaline solution; Uniclean® 155, 3 wt. %, Atotech Deutschland GmbH)
1a. Rinsed
2. Pickled (acid, Uniclean® 675, Atotech Deutschland GmbH)
2a. Rinsed
3. Electrolytically degreased (alkaline Uniclean® 279, Atotech Deutschland GmbH)
3a. Rinsed
4. Microetched (pickling, acid; Uniclean® 697, Atotech Deutschland GmbH)
4a. Rinsed.

Then the barrier coating and the solder/brazing coating were deposited. For this, first was:
5. Nickel deposition (electroless or electrolytically), thickness 5 μm (nickel sulfamate bath, Atotech Deutschland GmbH)
5a. Rinsing The nickel coating acts a multifunctional barrier coating. Then a thin coating of silver was deposited on the barrier coating from electrolytes containing a silver complex. For this:
6. Pre-silver was deposited (electrolytically), thickness <1 μm (silver Trisalyt®, Atotech Deustchland GmbH)
6a. Rinsing Then the solder/brazing coating was formed. For this, first was
7. Silver deposition (electrolytically), thickness 10 μm (AgO-56®, Atotech Deutschland GmbH)
7a. Rinsing Silver acted as a high-melting partial solder/brazing coating. Then the low-melting partial solder/brazing coating was deposited. For this:
8. Tin was deposited (electrolytically), thickness 3 μm (Sulfotech™, Atotech Deutschland GmbH)
8a. Rinsing
8b. Drying The sheets were each rinsed with deionized water.

The coated sheets were stacked in a laminar press either individually or preferably in the multiple panels. Then the following series of tests for manufacturing components with the same design but different quality properties was performed:
a. A soldering temperature of 250° C. was set at a heating rate of 7 K/min and cooling began after the soldering temperature was achieved, with no holding period. The stack was not actively cooled. The duration of the cooling phase was approx. 60 min. A pressure of 4.5 MPa was exerted on the stack during the entire soldering process. The components demonstrated pressure stabilities of lower quality and a very high reject rate (80%). The components leaked in the design used in this example and with a bottom plate thickness of 1 mm with an inner pressure in the range of 0 to 2 bar. The composition of the solder/brazing seam was determined with SEM/EDX and demonstrated that the high-melting and the low-melting partial solder/brazing coatings were in the main still present in their original forms.
b. A soldering temperature of 250° C. was attained at a heating rate of 7 K/min. Once attained, the soldering temperature was maintained for 30 minutes. The stack was not actively cooled. The duration of the cooling phase was approx. 60 minutes. A pressure of 4.5 MPa was exerted on the stack during the entire soldering process. The components, with a design identical to that in trial a and with a bottom plate thickness of 1 mm, leaked at an inner pressure in the range of 10 to 15 bar. The composition of the solder/brazing seam was determined with SEM/EDX and demonstrated that in addition to the high-melting and the low-melting partial solder/brazing coatings, the phase of the composition $Ag_3Sn$ (ε phase) had formed.
c. Components that had been joined in accordance with trial a were thermally post-treated in an oven for 30 minutes at a temperature of 330° C. without pressure being exerted on the components. In the subsequent burst test, the components leaked at an inner pressure of approximately 30 bar. The composition of the solder/brazing seam was determined with SEM/EDX and demonstrated that in addition to the high-melting and the low-melting partial solder/brazing coatings, the phase of the composition $Ag_3Sn$ (ε phase) and the phase of the composition $Ag_5Sn$ (ζ phase) had formed.
d. A soldering temperature of 330° C. was attained at a heating rate of 7 K/min and after the soldering temperature was attained cooling took place with no holding time. The stack was not actively cooled. The duration of the cooling phase was approx. 90 minutes. A pressure of 4.5 MPa was exerted on the stack during the entire soldering process. The components, with a design identical to that in trial a and a bottom plate thickness of 1 mm, leaked in the subsequent bursting test at an inner pressure in the range of 5 to 10 bar. The composition of the solder/brazing seam was determined with SEM/EDX and demonstrated that in addition to the high-melting and the low-melting partial solder/brazing coatings the phase of the composition $Ag_3Sn$ ($\epsilon$ phase) had formed.

e. Components that had been joined in accordance with trial d were post-treated in an oven for 30 minutes at a temperature of 330.degree. C. without pressure being exerted on the components. The components leaked in the subsequent burst test at an inner pressure in the range of 35 to 40 bar. The composition of the solder/brazing seam was determined with SEM/EDX. Analysis demonstrated that in addition to the high-melting and the low-melting partial solder/brazing coatings the phase of the composition Ag.sub.3Sn (.epsilon. phase) and the phase of the composition Ag.sub.5Sn (.zeta. phase) had been formed.

f. Components that had been joined in accordance with trial d were thermally post-treated in an oven for 30 minutes at a temperature of 330.degree. C., whereby a pressure of 4.5 MPa was exerted on the components during the entire tempering period. Following this tempering at the soaking temperature the components were allowed to cool. The components did not leak in the subsequent burst test up to an inner pressure of 60 bar. The composition of the solder/brazing seam was determined with SEM/EDX. Analysis demonstrated that the phases of the composition Ag.sub.3Sn (.epsilon. phase) and primarily the composition Ag.sub.5Sn (.zeta. phase) were formed.

These results demonstrate the qualitative connection between soldering/brazing temperature, soldering/brazing duration, and pressure in terms of the burst-resistance of the microstructure components. The absolute values of the burst pressures are highly dependent on the selected design and the thickness of the bottom plate and can therefore only be compared between components of identical design under identical conditions. Overall, however, the trials demonstrate that for instance the processing time at a temperature of 330° C. can be substantially shortened and the burst-resistance can be substantially increased by a subsequent tempering step without additional pressure.

In the examples this increase in burst-resistance is directly linked to the strengthened formation of the intermetallic phase that is more enriched with silver and to the mixed crystal. A further increase in burst-resistance can be obtained by increasing the silver coating thickness, holding duration, processing temperature(s), and pressure.

The method described herein can be used to intentionally obtain the product properties as a function of process costs.

DETAILED DESCRIPTION OF THE INVENTION

The invention is explained in greater detail in the following.

Figure 2A:
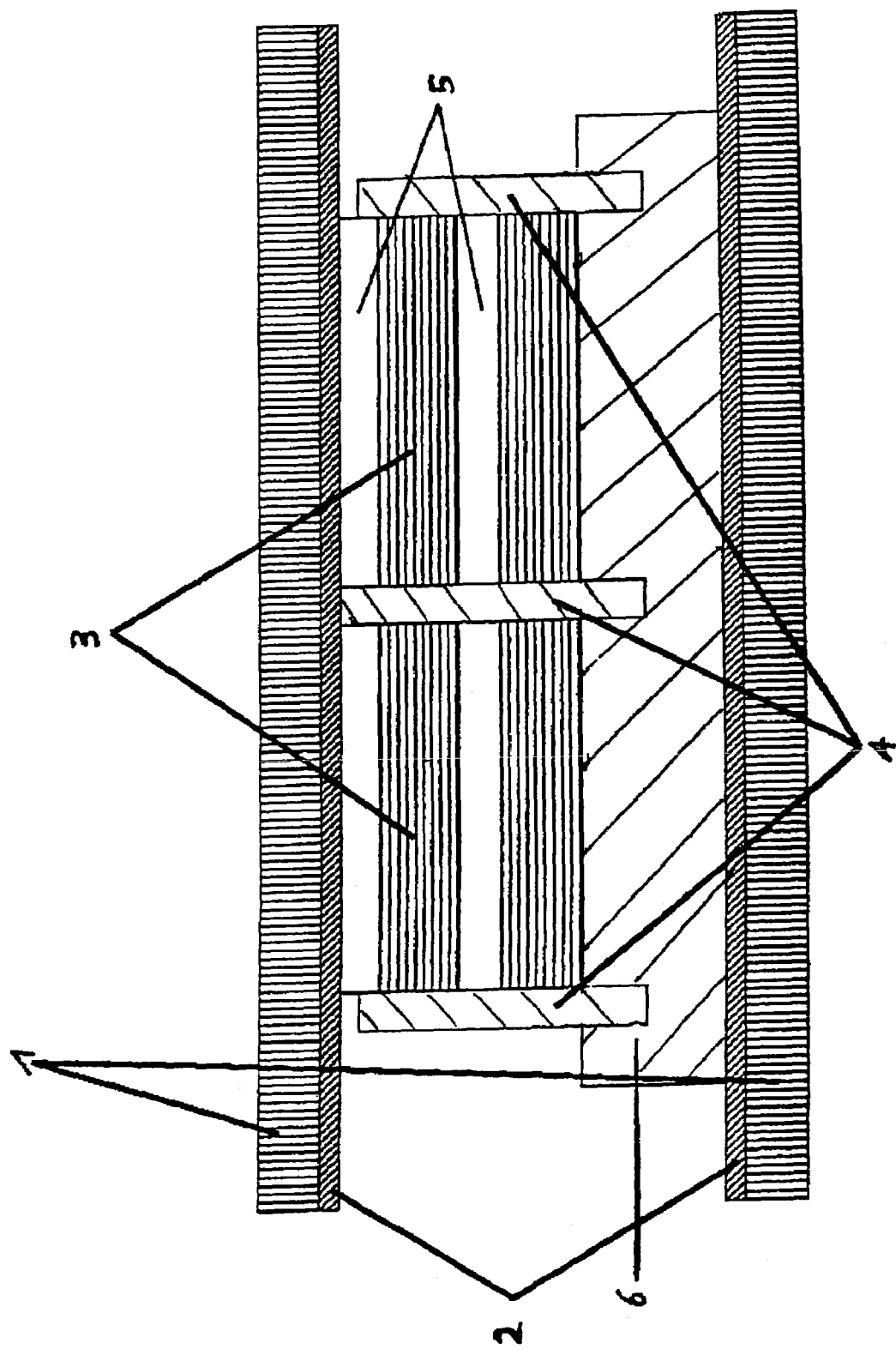
FIG. 2a: is a cross-sectional illustration of a soldering/brazing structure with microstructure components.
Figure 2:
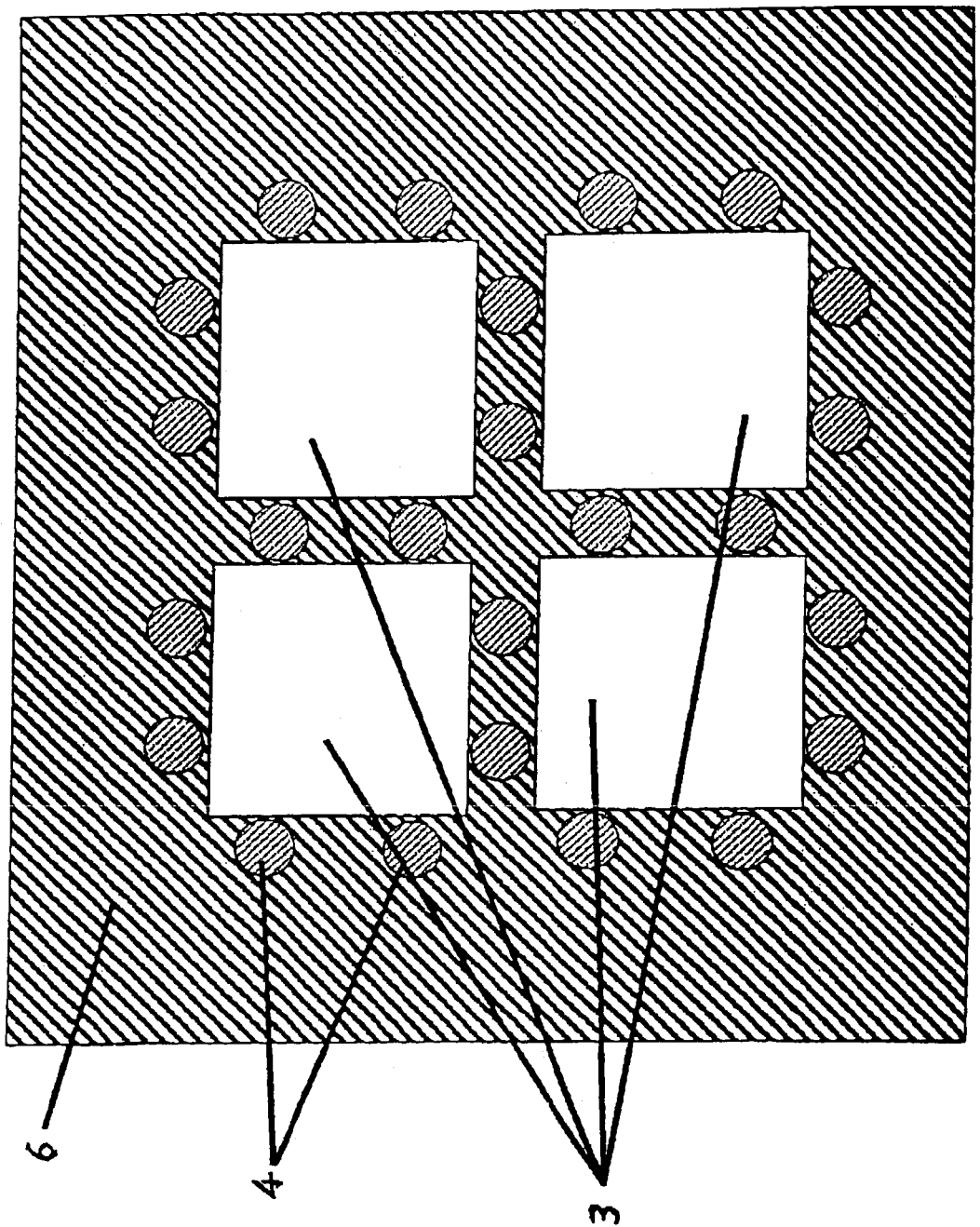
FIG. 2b: is a too view illustration of a soldering/brazing structure with microstructure components.

FIG. 2a illustrates a cross-section of a soldering/brazing structure with microstructure components 3. The microcomponents 3 are registered via registration pins 4 mounted in the bottom plate 6. Pressure is applied via pressure tools 1, whereby the pressure cushions 2 compensate heights between the individual microcomponents 3 and thus enable uniform pressure distribution. FIG. 2b is a top-view of the soldering/brazing structure. It can be seen that the registration pins 4 are mounted on the bottom plate 6. The microcomponents are labeled with the reference number 3.

Figure 3:
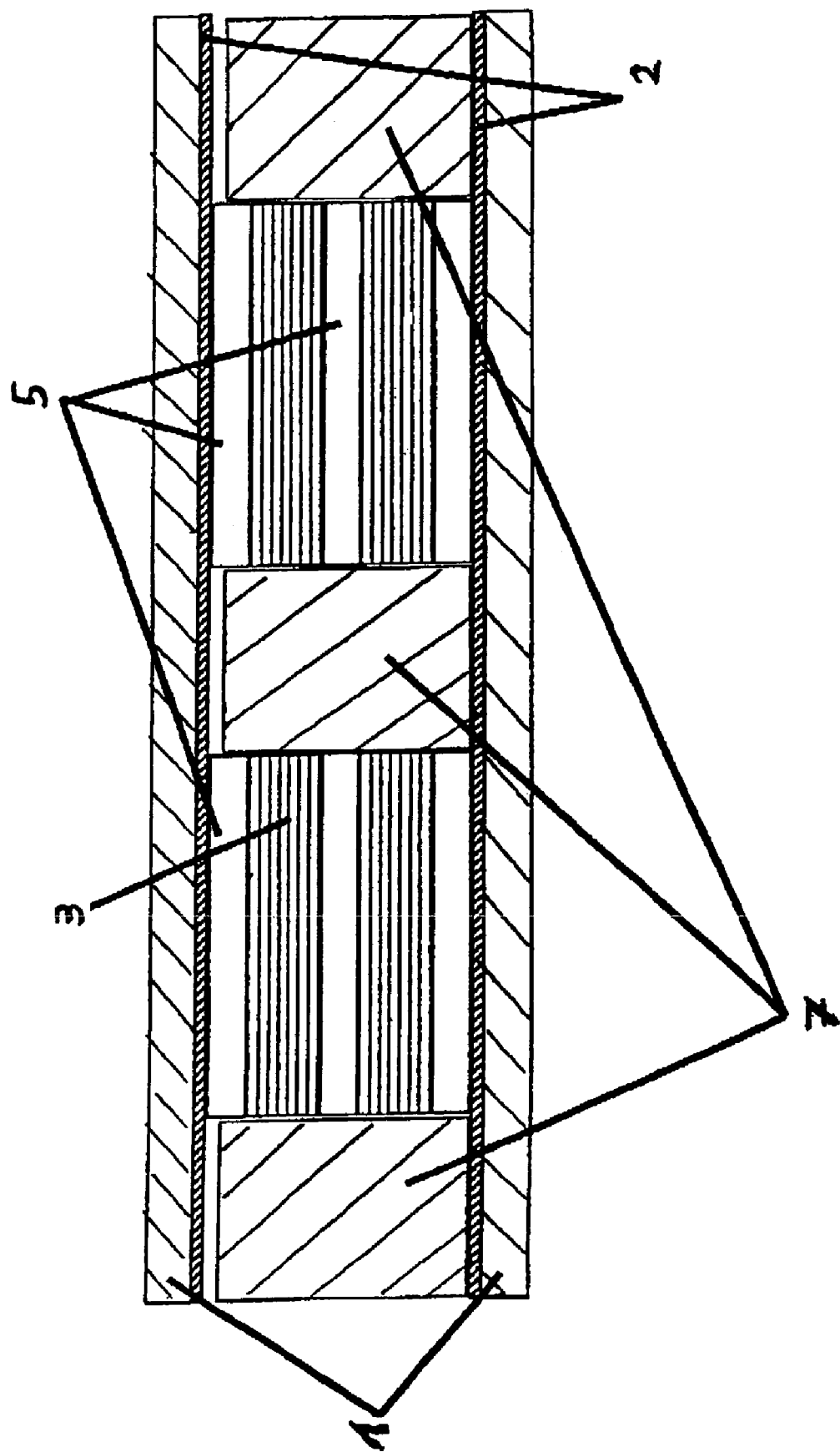
FIG. 3: is a cross-sectional side elevation of a template for registering microstructure components.

FIG. 3 is a cross-sectional side elevation of a template 7 for registering microstructure components 3. The microstructure components 3 are separated from one another in the template 7 by intermediate plates 5. Pressure is applied via pressure tools 1, whereby the pressure cushions 2 compensate heights between the individual microcomponents 3 and thus enable uniform pressure distribution.

Figure 4:
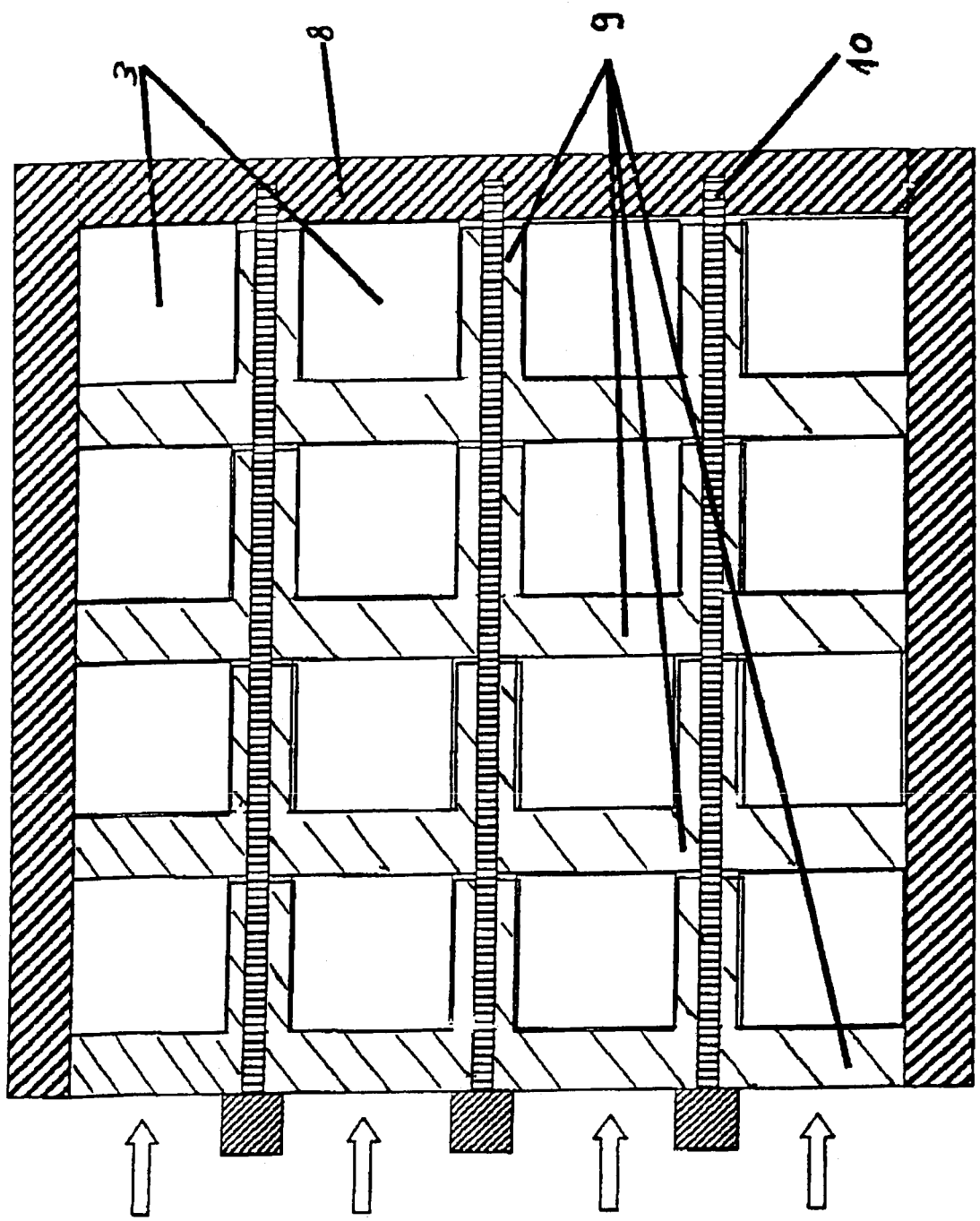
FIG. 4: is a top view of a component mount with microstructure components.

FIG. 4 is a top-view of a component mount with microstructure components 3. The microstructure components 3 are registered via displaceable registration apparatus 9 that are moved via a clamping apparatus 10. A frame 8 guides the registration apparatus 9 and absorbs the force of the clamping apparatus 10. The arrows indicate the direction in which a tension force can be exerted on the microstructure components 3 by the registration apparatus 9 and the clamping apparatus 10 for registration.

Figure 5:
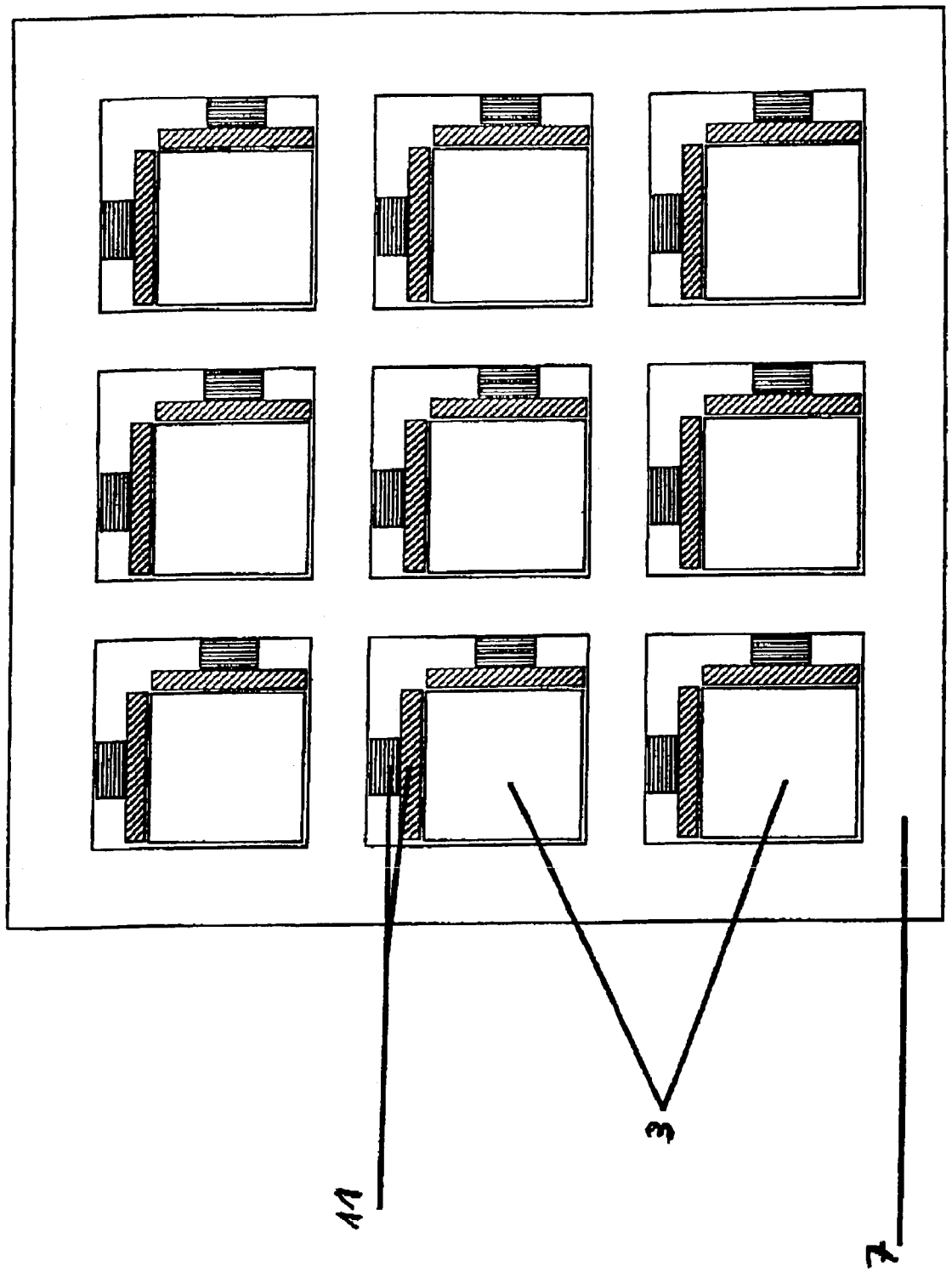
FIG. 5: is a top view of a template in a first embodiment.

FIG. 5 is a top-view of a template 7. The microstructure components 3 are registered via a lateral pressure plate with spring 11. The microstructure components 3 are pushed into the template walls in the template 7 on two sides.

Figure 6:
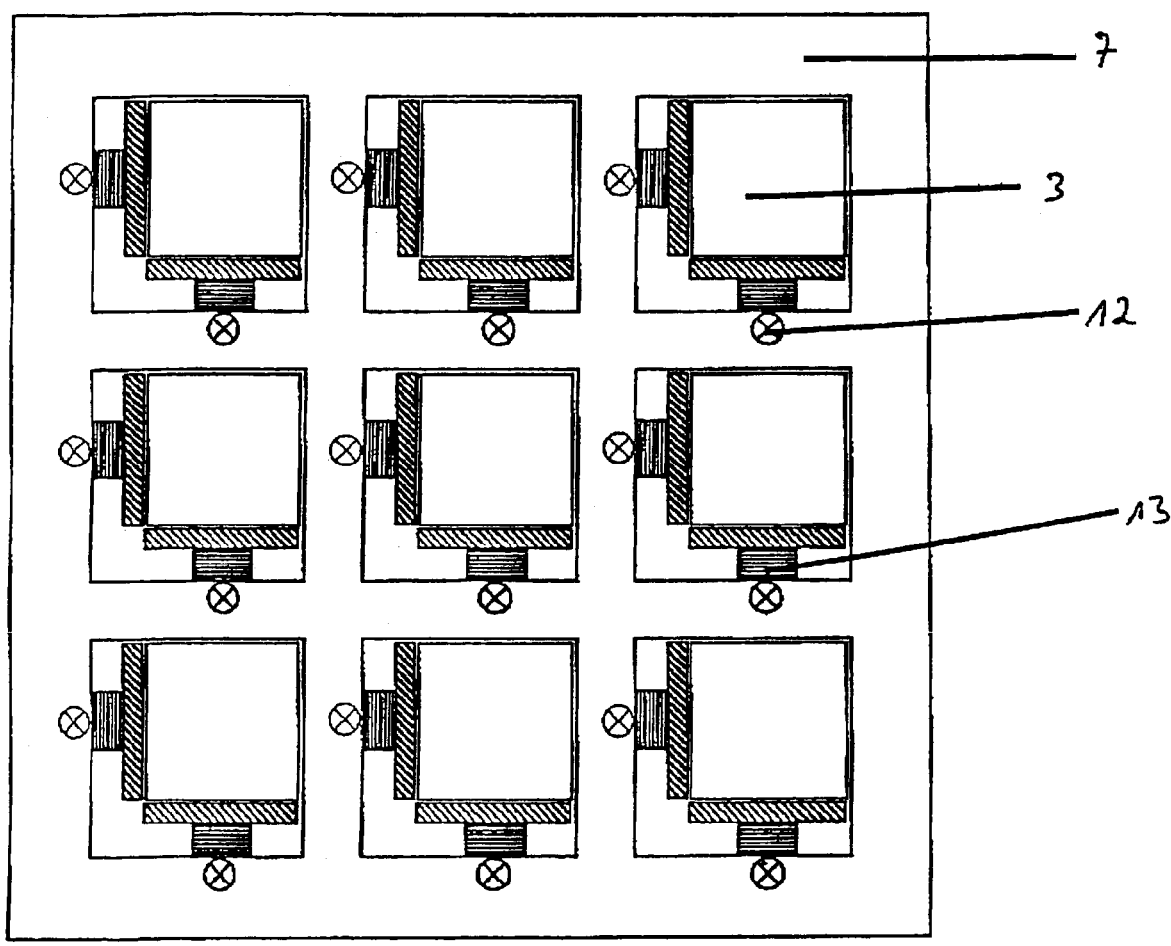
Figure 6:
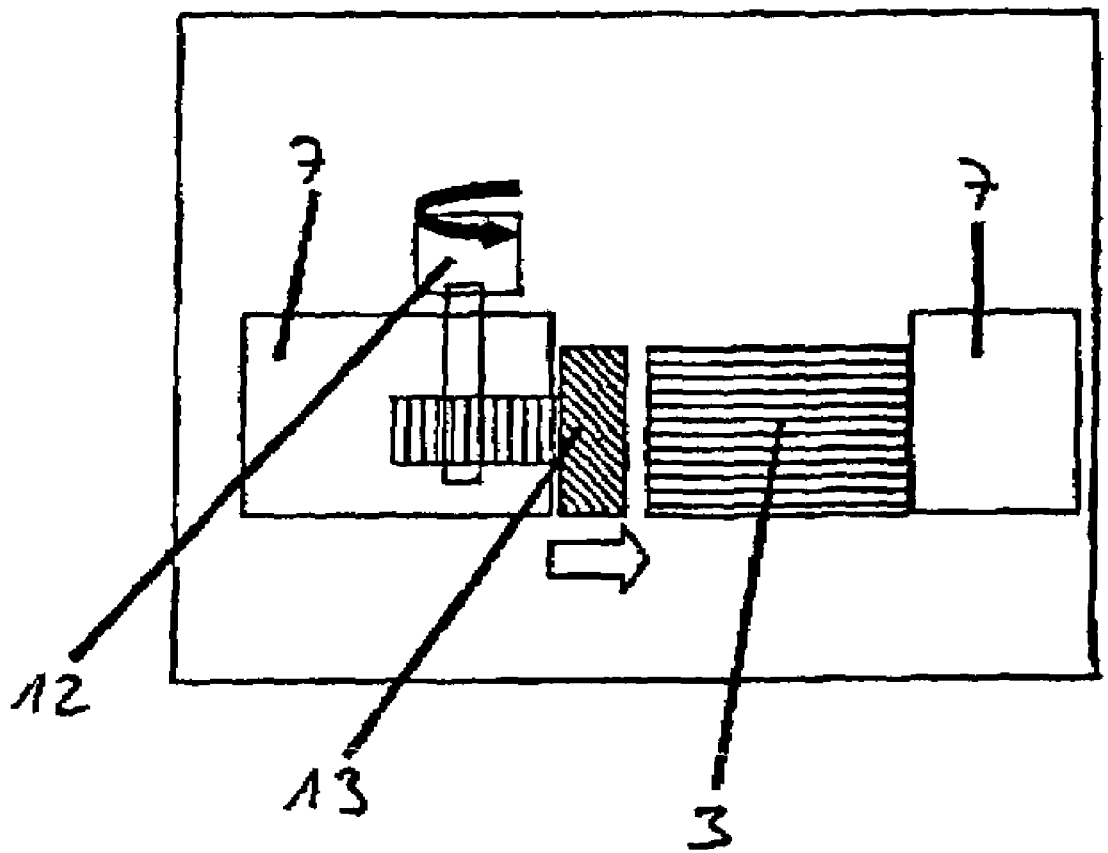

FIG. 6a is a top-view of a template 7. The microstructure components 3 are registered by means of a pressure plate with registration screw 13 that is moved via a set-screw 12. The microstructure components 3 are pushed into the template walls in the template 7 on two sides. FIG. 6b is an enlarged illustration of the setting apparatus. It illustrates the registration screw 13 with the set-screw 12 (direction of rotation indicated by closed arrow) in detail. The microstructure component 3 illustrated is pressed in the direction of the open arrow against the opposing wall of the template 7 in order to align the individual component layers with one another.

Figure 7:
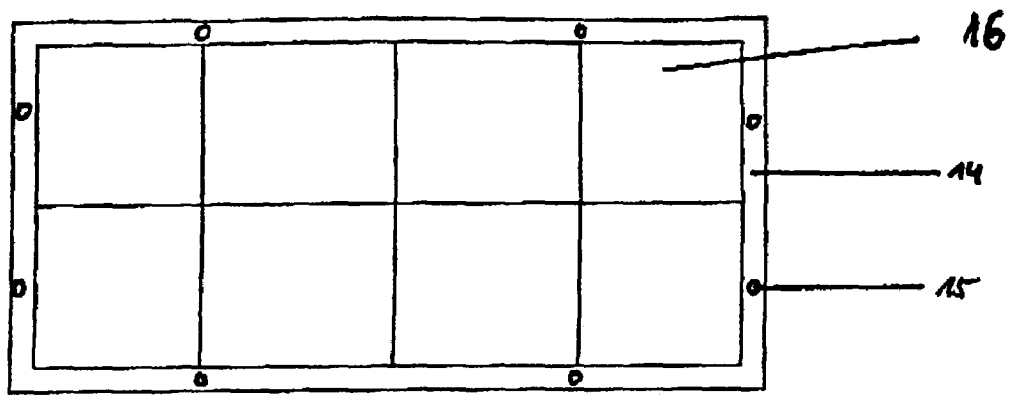
FIG. 7: is a top view of a multiple panel with registration bores.

FIG. 7 is a top-view of a multiple panel 14 with registration bores 15; the multiple panels 14 comprise a plurality of microstructure sheets 16 that are used to manufacture microstructure components. In this case, the microstructure components 16 are separated after soldering/brazing.

Figure 8:
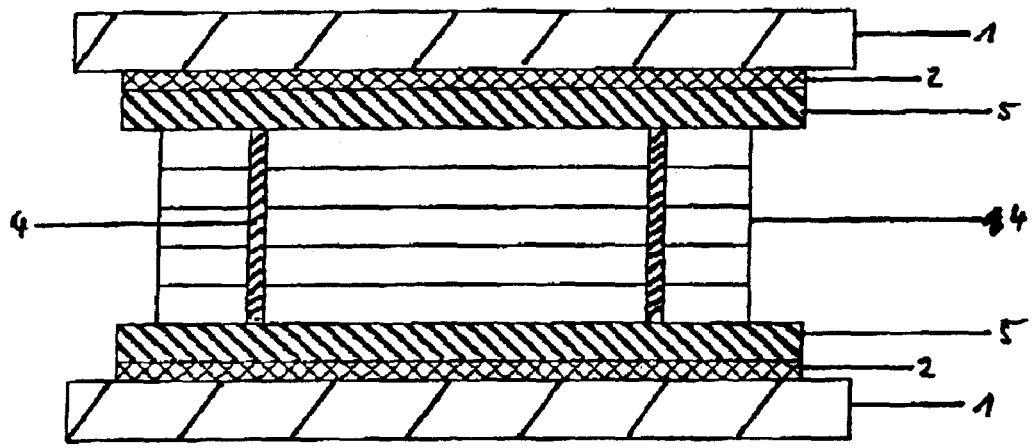
Figure 8:
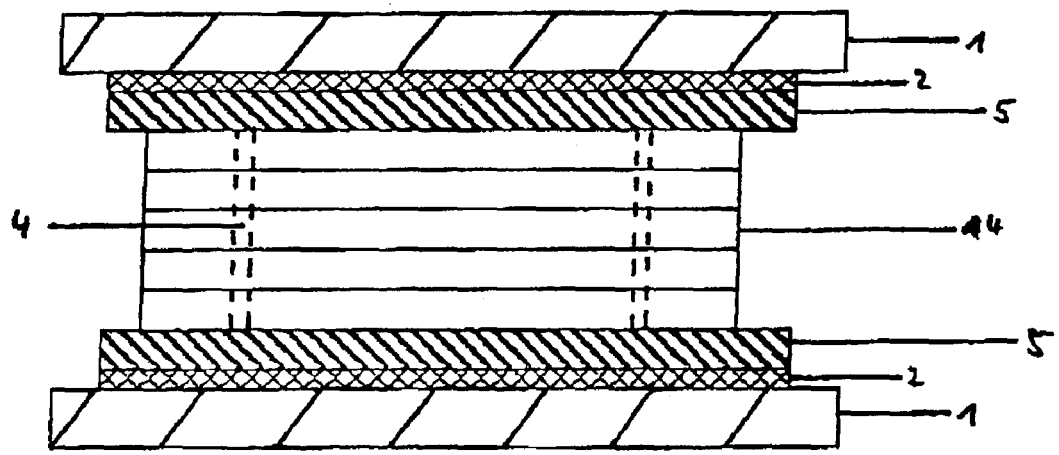

FIG. 8a is a cross-sectional side elevation of the soldering/brazing structure for soldering/brazing multiple panels 14. The multiple panels 14 are registered using exteriorly attached registration pins 4 that are connected to the intermediate plates 5. The joining pressure is introduced via the pressure tool 1. The pressure cushions 2 ensure uniform pressure distribution. FIG. 8b is an illustration corresponding to FIG. 8a. The multiple panels 14 are registered by registration pins 4 that are inserted through the registration bores 15 in the multiple panels 14 that are illustrated in FIG. 7.

| Key | |
|---|---|
| 1 | Pressure tool |
| 2 | Pressure cushion |
| 3 | Microstructure components |
| 4 | Registration pins |
| 5 | Intermediate plates |
| 6 | Bottom plate |
| 7 | Template |
| 8 | Frame |
| 9 | Adjustable registration apparatus |
| 10 | Clamping apparatus |
| 11 | Pressure plate with spring |
| 12 | Set-screw |
| 13 | Pressure plate with registration screw |
| 14 | Multiple panel |

-continued

| Key | |
|---|---|
| 15 | Registration bore |
| 16 | Microstructure sheets |

The invention claimed is:

1. Method for joining microstructured component layers for manufacturing microstructure components, wherein each said respective component layer comprises a base layer bearing micro-passageways/channels of a material selected from the group consisting of metals and metal alloys, comprising the steps of:
applying a multifunctional barrier coating layer to each joining surface of each said base layer,
applying at least one solder/brazing coating onto each said multifunctional barrier coating,
stacking said coated base layers with the coated joining surfaces juxtaposed wherein said coatings therebetween are symmetrically oriented, and
solder/brazing said stacked component layers using heat and pressure to produce a said microstructure component,
wherein each said solder/brazing coating forms intermetallic phases of partial solder/brazing coatings when heated, and
whereby each said multifunctional barrier coating prevents oxidation of said respective base layer and prevents diffusion between the solder/brazing coating and each said base layer.

2. Method in accordance with claim 1, characterized in that said group of metals and metal alloys are selected from the group consisting of aluminum, aluminum alloys, copper, copper alloys, and noble steels, and wherein the soldering/brazing of said component layers is fluxless.

3. Method in accordance with claim 2, characterized in that said soldering/brazing step is a diffusion soldering/brazing step; and wherein each said multifunctional barrier coating also provides and adhesiveness between the respective base layer and solder/brazing coating.

4. Method in accordance with claim 1, characterized in that said at least one solder/brazing applying step includes:
applying a high-melting temperature solder/brazing coating onto each said multifunctional barrier coating; and
applying a low-melting temperature solder/brazing coating onto each said high-melt temperature coating.

5. Method in accordance with claim 4, characterized in that said high-melting solder/brazing coating is a partial solder/brazing coating and said low-melting solder/brazing coating is a partial solder/brazing coating; and wherein the composition and thickness of said partial solder/brazing coatings are selected such that an initial eutectic melt can form during said solder/brazing step.

6. Method in accordance with any one of claims 1 and 5, characterized in that after said solder/brazing step are the steps of:
permitting said solder/brazed microstructure component to cool; and
tempering said cooled microstructure component to provide a tempered solder/brazed joint.

7. Method in accordance with any one of claims 1 and 5, characterized in that before said multifunctional barrier coating layer applying step, said base layer is pretreated including the steps of:
degreasing the joining surface of each said base layer; and
treating each said degreased joining surface with a process selected from the group consisting of pickling and micro-etching.

8. Method in accordance with claim 5, characterized in that said high-melting partial solder/brazing coating embodies at least one metal selected from the group consisting of silver, gold, nickel, and copper.

9. Method in accordance with claim 5, characterized in that said low-melting partial solder/brazing coating embodies at least one metal selected from the group consisting of tin, indium, and bismuth.

10. Method in accordance with claim 5, characterized in that said high-melting partial solder/brazing coating embodies at least one metal selected from the group consisting of silver, gold, nickel, and copper, and said low-melting partial solder/brazing coating embodies at least one metal selected from the group consisting of tin, indium, and bismuth.

11. Method in accordance with any one of claims 1, 5 and 10, characterized in that said multifunctional barrier coating embodies at least one metal selected from the group consisting of molybdenum, manganese, chromium, palladium, iron, nickel, and alloys of at least one metal selected from the group consisting of iron and nickel, with phosphorous.

12. Method in accordance with any one of claims 1 and claim 5, characterized in that wherein after said solder/brazing step are the steps of:
permitting said solder/brazed microstructure component to cool; and
and
tempering said cooled microstructure component to provide a tempered solder/brazed joint;
wherein before the multifunctional barrier coating layer applying step are the steps of:
degreasing the joining surface of each said base layer; and
treating each said degreased joining surface with a process selected from the group consisting of pickling and micro-etching.

13. Method in accordance with claim 12, characterized in that said high-melting partial solder/brazing coating embodies at least one metal selected from the group consisting of silver, gold, nickel, and copper, and said low-melting partial solder/brazing coating embodies at least one metal selected from the group consisting of tin, indium, and bismuth, and said multifunctional barrier coating embodies at least one metal selected from the group consisting of molybdenum, manganese, chromium, palladium, iron, nickel, and alloys of at least one metal selected from the group consisting of iron and nickel, with phosphorous.

14. Method in accordance with claim 13, characterized in that after said pickling/micro-etching treating step is the step of: zincate coating each said pickled/micro-etched joining surface.

15. Method for joining microstructured component layers for manufacturing microstructure components, wherein said component layers each comprise a base layer bearing micro-passageways/channels and substances selected from the group consisting of metals and metal alloys, comprising the steps of:
applying a multifunctional barrier coating to all joining surfaces of each of said component layers, and
applying at least one solder/brazing coating onto each said multifunctional barrier coating,
stacking said coated component layers with said joining surfaces juxtaposed, and
solder/brazing said stacked component layers to join them to one another, characterized in that after said component layers are joined to one another they are rapidly cooled, and further characterized in that said component layers are soldered/brazed joined in multiple panels to simultaneously manufacture multiple microstructure components with micro-passageways/channels.

16. Method in accordance with claim 15, characterized in that soldering/brazing is performed at a temperature in the range of 100 to 600° C., at a pressure under which the stack is pressed of at least 0.1 MPa, with a holding time of up to 60 minutes, and temperature treatment is performed with a tempering time up to to 60 minutes, and wherein after said rapid cooling step, said multiple microstructure components are separated by cutting, milling, punching or lasering.

17. Method in accordance with any one of claims 15 and 16, characterized in that said at least one solder/brazing applying step includes applying a high-melting temperature solder/brazing coating onto each said multifunctional barrier coating, and applying a low-melting temperature solder/brazing coating onto each said high-melt temperature coating, and wherein at least one coating selected from the group consisting of multifunctional barrier coatings, high-melting partial solder/brazing coatings, and low-melting partial solder/brazing coatings is formed by means of electroplating methods.

18. Method in accordance with any one of claims 15 and 16, characterized in that said solder/brazing step is carried out in a PC board laminating press.

19. Method in accordance with claim 17, characterized in that during said soldering/brazing step pressure is exerted on said stacked component layers using plates, layers or films made of a material selected from the group consisting of metals, ceramics, graphite, and composites being used as pressure tools against said stacked component layers.

20. Method for joining a plurality of microstructured component layers for manufacturing microstructure components, said component layers comprising substances selected from the group consisting of metals and metal alloys comprising the steps of:

applying a multifunctional barrier coating to joining surfaces of said component layers, wherein said multifunction barrier coating performs two functions selected from the group consisting of providing adhesiveness, preventing diffusion and preventing oxidation, applying at least one solder/brazing coating to each said multifunctional barrier coating, each said solder/brazing coating having eutectic characteristics, stacking said coated component layers, and solder/brazing said stacked coated component layers to one another using heat, characterized in that during said stack solder/brazing step pressure is applied using a top and bottom pressure plates, wherein between said top and bottom pressure plate and respectively the top and bottom of said stacked coated component layers ceramic fleeces are used as pressure cushions to compensate for differences in height and to apply uniform pressure.

21. Method in accordance with any one of claims 1, 15, 16 and 20, characterized in that during solder/brazing step registration apparatus, registration pins, or templates are used for registration.

22. Method in accordance with claim 21, characterized in that said registration apparatus, registration pins, or templates comprise a material selected from the group consisting of graphite, ceramic, and metal.

23. Method in accordance with any one of claims 1, 15, 16 and 20, characterized in that during soldering/brazing step structural features of the component layers are used for auto-registration.

24. Method in accordance with any one of claims 15 and 20, characterized in that said component layers are separated after said solder/brazing step by cutting, milling, punching, or lasering.

25. The method of any one of claims 15 and 20 also characterized in that said group of metals and metal alloys are selected from the group consisting of aluminum, aluminum alloys, copper, copper alloys, and noble steels.

26. The method of any one of claims 15 and 20 also characterized in that wherein after said solder/brazing step are the steps of:

permitting said solder/brazed microstructure component to cool; and
and
tempering said cooled microstructure component to provide a tempered solder/brazed joint;

wherein before the multifunctional barrier coating layer applying step are the steps of:

degreasing the joining surface of each said base layer; and
treating each said degreased joining surface with a process selected from the group consisting of pickling and micro-etching; and wherein after said pickling/micro-etching treating step is the step of:

zincate coating each said pickled/micro-etched joining surface.

27. Method for joining a plurality of microstructured component layers having joining surfaces, said joined component layers being suitable for manufacturing microstructure components, wherein each component layer includes a base substrate having joining surfaces and being of a material bearing micro-passageways/channels and selected from the group consisting of metals and metal alloys, comprising the steps of:

applying a multifunctional diffusion barrier coating to each of said joining surfaces of each said base substrate, and applying at least one solder/brazing coating over each multifunctional barrier coating on each said base substrate, wherein said multifunctional barrier coating both prevents diffusion between the solder/brazing coating and the base substrate material and provides adhesion between the solder/brazing coating and the base substrate material, and stacking said coated component layers wherein said coatings between adjacent component layers are symmetrically oriented, and solder/brazing said stacked coated component layers to one another using heat and pressure, wherein said component layers are joined at a solder/brazing temperature, whereof a eutectic melt is formed during the said joining wherein at first a very low melting temperature is obtained wherein the melting point gradually shifts to a higher temperature wherein the bond is tempered, whereof each solder/brazing coating after said joining has a melting temperature that is higher than the original solder/brazing temperature, and wherein after said solder/brazing joining step said solder/braze joint is tempered at an elevated temperature above said solder/brazing temperature.

* * * * *

UNITED STATES PATENT AND TRADEMARK OFFICE
CERTIFICATE OF CORRECTION

| | |
|---|---|
| PATENT NO. | : 7,380,698 B2 |
| APPLICATION NO. | : 10/394601 |
| DATED | : June 3, 2008 |
| INVENTOR(S) | : Heinrich Meyer et al. |

It is certified that error appears in the above-identified patent and that said Letters Patent is hereby corrected as shown below:

Column 2, line 66 (last line), insert --of-- after "manufacture";
Column 4, line 45, replace "properties in addition" with --properties. In addition--;
Column 13, line 51, replace "too" with --top--;
Column 14, line 30, insert --as-- after "acts";
Column 19, Claim 3, line 4, replace "provides and adhesiveness" with --provides an adhesiveness--;
Column 20, Claim 12, line 5, delete "and";
Column 21, Claim 16, line 6, replace "time up to to 60" with --time up to 60--;
Column 22, Claim 26, line 5, delete "and".

Signed and Sealed this

Twenty-sixth Day of August, 2008

JON W. DUDAS
*Director of the United States Patent and Trademark Office*